United States Patent
Hagquist

(12) 
(10) Patent No.: US 6,288,133 B1
(45) Date of Patent: Sep. 11, 2001

(54) FOAMING URETHANE COMPOSITION AND METHODS OF USING SUCH COMPOSITIONS

(75) Inventor: James A. Hagquist, St. Paul, MN (US)

(73) Assignee: H. B. Fuller Licensing & Financing Inc., St. Paul, MN (US)

(*) Notice: Subject to any disclaimer, the term of this patent is extended or adjusted under 35 U.S.C. 154(b) by 0 days.

(21) Appl. No.: 09/148,434

(22) Filed: Sep. 4, 1998

Related U.S. Application Data

(60) Provisional application No. 60/058,981, filed on Sep. 10, 1997.

(51) Int. Cl.$^7$ ..................................................... C08G 18/32
(52) U.S. Cl. .......................... 521/163; 521/172; 521/173; 238/29; 156/77; 523/130; 523/131; 528/74.5
(58) Field of Search ..................................... 521/163, 172, 521/173; 238/29; 156/77; 523/130, 131; 528/74.5

(56) References Cited

U.S. PATENT DOCUMENTS

| | | | |
|---|---|---|---|
| 3,191,864 | 6/1965 | Moses | 264/36 |
| 3,716,608 | 2/1973 | Neumann | 264/36 |
| 4,070,201 | 1/1978 | Tessenske | 238/371 |
| 4,152,185 | 5/1979 | Tessenske | 156/94 |
| 4,248,811 | 2/1981 | Doyle et al. | 521/172 |
| 4,264,743 | 4/1981 | Maruyama et al. | 521/101 |
| 4,295,259 | 10/1981 | Rhodes et al. | 29/432 |
| 4,475,847 * | 10/1984 | Cornely | 405/264 |
| 4,661,532 | 4/1987 | Morin | 521/167 |
| 4,990,586 | 2/1991 | Case | 528/64 |
| 5,124,367 | 6/1992 | Barker et al. | 521/107 |
| 5,338,767 * | 8/1994 | Sartelet | 521/159 |
| 5,422,380 * | 6/1995 | Mendelsohn et al. | 521/107 |
| 5,470,515 | 11/1995 | Grimm et al. | 264/255 |
| 5,476,681 | 12/1995 | Sampara et al. | 427/140 |
| 5,886,062 * | 3/1999 | Dietrich | 521/167 |

FOREIGN PATENT DOCUMENTS

| | | |
|---|---|---|
| 2165614 | 8/1996 | (CA) . |
| 0 672 697 A | 9/1995 | (EP) . |
| 0 826 706 A | 3/1998 | (EP) . |
| 89 09096 | 10/1989 | (WO) . |
| 94 14865 A | 7/1994 | (WO) . |

OTHER PUBLICATIONS

Saunders & Fried; Polyurethanes; Part II, pp. 248–250, 1964.*

* cited by examiner

Primary Examiner—Rachel Gorr
(74) Attorney, Agent, or Firm—Nancy Quan; Bin Su

(57) ABSTRACT

This invention relates to a foamable composition comprising at least two parts. More specifically, the first part comprises at least one polyol, at least one gelling agent, and at least one blowing agent wherein the first part comprises an effective amount of hydrophobic ingredients and a second part comprising at least one isocyanate. A foam mass can be prepared by a method of combining a polyol component with an isocyanate component substantially free of urethane prepolymer and applying the mixture to a void or substrate. The invention also relates to methods of using certain polyurethane compositions in the repair of surface defects or for the reinforcement of structural members such as spike holes left after spike removal from railroad ties during road bed maintenance or repair. This invention further relates to a method of foaming certain polyurethane compositions in the presence of water.

24 Claims, 2 Drawing Sheets

FOAMING URETHANE COMPOSITION AND METHODS OF USING SUCH COMPOSITIONS

CROSS-REFERENCE TO RELATED APPLICATION

This application is a Continuation-In-Part of provisional application U.S. Ser. No. 60/058,981, filed Sep. 10, 1997, which application is incorporated herein by reference.

FIELD OF THE INVENTION

This invention relates to a foamable composition comprising at least two parts. More specifically, the first part comprises at least one polyol, at least one gelling agent, and at least one blowing agent wherein the first part comprises an effective amount of hydrophobic ingredients and a second part comprising at least one isocyanate. A foam mass can be prepared by a method of combining the polyol component with an isocyanate component substantially free of urethane prepolymer and applying the mixture to a void or substrate. The invention also relates to methods of using certain polyurethane compositions in the repair of surface defects or for the reinforcement of structural members such as spike holes left after spike removal from railroad ties during road bed maintenance or repair. This invention further relates to a method of foaming certain polyurethane compositions in the presence of water.

BACKGROUND OF THE INVENTION

Materials used to repair defects in structural members should have certain characteristics. The material should be easily applied and should form high strength bonds to structural members made of varying materials. Particularly for outdoor repairs, the repair materials should be usable in many environments including environments having extremes of heat and cold and having the presence of substantial quantities of environmental water.

One particularly important end use for such repair compositions is in the recycle or reuse of railroad ties. Typically in the maintenance of the railroad right of way, the rails along with the tie plates and spikes, are removed from railroad ties which remain in the roadbed. If a new rail is to be spiked to the old tie, it is critical that the railroad tie spike holes be repaired prior to laying the new rail. The presence of spike holes in an old tie can cause problems since if a spike is driven into a portion of the tie near an old spike hole, the driving force of the spike can displace the spike from its intended location into an old hole, displacing the rail, tie plate and spike. In the instance that the spike is driven into an incorrect location substantial economic loss can result in repairing the misaligned rail. If a misaligned rail is not repaired, the defect can cause derailment or other problems. Further, the spike holes can be the source of structural weakness in the tie, allowing water to enter the core of the tie accelerating the degradation.

Mechanical spike hole repair means have been suggested in the art. For example, Moses, U.S. Pat. No. 3,191,864, issued Jun. 29, 1965 teaches a mechanical spike hole insert used by first boring out an old spike hole, installing an insert and driving a new spike into the insert. Newman U.S. Pat. No. 3,716,608, issued Feb. 13, 1973 teaches metallic inserts that can be placed in bored out spike holes with a filling of a synthetic resin into which the spikes can be driven. In another area of repair, Tessenski, U.S. Pat. Nos. 4,070,201 and 4,152,185, issued Jan. 24, 1978 and May 1, 1979 respectively, teach a railroad tie spike hole plugging material and method using a substantial uniform mixture of a granular abrasive material and a granular plastic material which is poured into the hole left after spike removal. The driving force of a spike into the abrasive material generates heat which plasticizes the material resulting in a firm bond of the spike to the material. Mechanical and resin-based hole filling methods tend to be time consuming, expensive and adapted to manual, not automatic application or installation.

Rhodes et al., U.S. Pat. No. 4,295,259, issued Oct. 20, 1981, teaches a method of reusing wooden railroad ties in which the old spike holes are filled with a high-density rigid polyurethane foam injected into the holes. At Co. 4, lines 14–20, this reference states that "Manufacturers of polyurethane chemicals caution that both components not be allowed to drop below 55° F. (13° C.) at any time, including shipping and storage. Temperatures below 55° F. (13° C.) apparently have a deleterious effect on the properties of the final product. Temperature control during operation is used to regulate viscosity."

Other polyurethane foam compositions have been suggested for other uses. For example, Maruyama et al., U.S. Pat. No. 4,264,743, issued Apr. 29, 1981, teaches a polyurethane foam scaling material prepared from a polyisocyanate and a polyol component, a major portion of said polyol component consisting of polyol derived from a dimer acid or castor oil, or a mixture thereof in the presence of a blowing agent, a foam stabilizer, a catalyst, and optionally, a lipophilic filler. As the catalyst, tertiary amines and organotin compounds are preferably used. The sealing materials are suitable for use in fender, ventilator, air conditioning joints and other parts in automobiles, as well as in ships, refrigerators and other assembly products.

Barker et al., U.S. Pat. No. 5,124,367, issued Jun. 23, 1992 teaches a fire retardant composition comprising a dispersion of solid fire retardant additive in a liquid isocyanate-reactive compound having a functionality of from 2 to 8 and an average equivalent weight of from about 31 to about 5000 and, as an anti-settling agent, an effective amount of a fatty acid ester and/or amide such as castor oil. The anti-settling agent is disclosed in an amount of 0.05 to 5%. The composition is useful in the manufacture of fire resistant flexible and rigid foams.

Grimm et al., U.S. Pat. No. 5,470,515, issued Nov. 28, 1995, teaches insulating pipes by application of at least one insulating layer and at least one outer surface layer by rotational molding. A rigid polyurethane foam is used as the insulating layer while a solid polyurethane is used as the surface layer. The rigid polyurethane foam is obtained by the reaction of a) an aromatic isocyanate with b) a polyol component bearing on average at least 3 isocyanate-reactive hydrogen atoms containing: 1. a polyether containing at least two hydroxyl groups and having a molecular weight of 300 to 700, 2. an aliphatic, cycloaliphatic or aromatic polyamine having a molecular weight of 32 to 1,000 as a crosslinking agent and a blowing agent, and optional ingredients. The solid polyurethane is obtained by the reaction of a) an NCO-terminated prepolymer having an NCO content of 5 to 20% obtained by the reaction of 1) 4,4'-diphenyl methane diisocyanate, optionally admixed with 2,4' and 2,2'-isomers and 0 to 30% by weight components of high functionality with; 2) polyethers containing 2 to 4 OH groups having a molecular weight of 1,000 to 6,000 to which up to 30% by weight of a hydrophobicizing agent, preferably castor oil, has optionally been added with b) a polyol component containing 1) a polyether containing 2 to 4 isocyanate-reactive hydrogen atoms and having a molecular weight of 1,000 to 6,000; 2) 5 to 35% by weight of an aromatic diamine having a molecular weight of 122 to 400; 3) 0 to 5% by weight of an aliphatic or cycloaliphatic diamine having a molecular weight of 60 to 4000; 4) 0 to 30% of a hydrophobicizing agent and 5) optionally auxiliaries and additives.

Doyle et al., U.S. Pat. No. 4,248,811, issued Feb. 3, 1981, teaches equipment and formulations for the filling of ordinary pneumatic tires with a polyurethane foam. Exemplified is a composition wherein component A contains 4,4'-diphenylmethane diisocyanate (MDI) 5 equivalents 665 lbs. and hydroxy-terminated polybutadiene 1 equivalent 1250 lbs. and component B contains hydroxy-terminated polybutadiene 1.1 equivalents 1375 lbs., castor oil 1 equivalent 340 lbs, 1,4-butanediol 1 equivalents 80.1 lbs, silicone surfactant 35 lbs, tertiary amine catalyst 4.5 lbs., lead octoate catalyst 4.5 lbs, and tall oil fatty acid 30.0 lbs. The castor oil is added to compatibilize the polybutadiene.

The use of polyurethane foam in filling spike holes in used railroad ties can present significant problems. The polyurethane foam compositions do not appear to adhere to a spike hole with sufficient adhesion to prevent the accidental removal of the foam repair mass during the repair and subsequent mechanical rail installation. Further, the urethane foams of the prior art tended to foam uncontrollably in the presence of substantial environment moisture. Since moisture tends to accelerate the foaming properties of the urethane composition, the presence of water can cause too rapid of cell expansion resulting in a foam mass of low strength and low density which can result in the formation of an incomplete or unreliable repair of structural members.

Morin, U.S. Pat. No. 4,661,532, issued Apr. 18, 1987, teaches coal tar containing foaming urethane compositions and a method of repairing defects in structural components. A two package hydrophobic urethane foaming composition is disclosed in which the first package comprises a polyol made hydrophobic by the presence of an effective amount of a coal tar or coal tar pitch composition. Although the use of coal tar significantly improved the problems associated with adhesion and uncontrolled foaming of the polyurethane composition in the presence of substantial moisture, this approach has had limited commercial success due to worker safety hazards since coal tar has been identified as a carcinogen. Hence, products were developed in which the coal tar was replaced with a mixture of hydrophobic polyols comprising about 20 wt-% castor oil present in the polyol component. The viscosity of each part of such products is about 2,000 cPs at 77° F. (25° C.), but increases to about 50,000 cPs at 50° F. (10° C.), and in the excess of 100,000 cPs at 40° F. (4° C.). Hence, the coal tar containing compositions as well as the non-carcinogenic modifications were found to be difficult to apply by conventional application equipment without the addition of heat. The recommended application temperature for such products ranged from about 130° F. (54° C.) to about 140° F. (60° C.). As railroad repair becomes a year-round task, rather than seasonal during warmer months of the year, the difficulty in application became quite problematic.

Accordingly, a substantial need exists in the art for foamable compositions employing non-carcinogenic ingredients that can be used to repair surface defects on structural components such as railroad ties to provide a repair mass having strong adhesion to the substrate structural member, which can be used in the presence of substantial quantities of environmental water and can be used in automatic application equipment in all temperatures.

SUMMARY OF THE INVENTION

The applicant has discovered a polyurethane composition that can be foamed in the presence of high concentrations of water. The composition of the present invention builds viscosity and gels sufficiently fast enough that it can be foamed underwater, while still maintaining excellent foam quality such as foam structure, strength and density. The foamable polyurethane composition exhibits excellent adhesion to a variety of substrates including plastic, metal and wood, even when such substrates are wet.

The present invention is a foamable composition having at least two parts comprising:
  a) a part A comprising at least one polyol, at least one gelling agent, and at least one blowing agent; wherein the part A comprises an effective amount of hydrophobic ingredients; and
  b) a part B comprising at least one isocyanate.

Preferably, the polyol is castor oil and the gelling agent is a polyamine. Further, the polyurethane composition preferably further comprises at least one plasticizer in part A and/or part B to reduce the viscosity as a well as certain catalysts to attain the proper reaction rates after mixing and application. Advantageously, each part exhibits a low viscosity over a wide temperature range, having a Brookfield viscosity of less than about 10,000 cPs at temperature ranging from about 20° F. (−7° C.) to 40° F. (4° C.).

The invention further relates to a foam mass prepared by a method of:
  a) forming a mixture comprising a polyol component comprising at least one polyol, at least one gelling agent, and at least one blowing agent and an isocyanate component substantially free of prepolymer;
  b) applying the mixture to a void or substrate.

In this embodiment, the isocyanate component is preferably substantially free of isocyanate reactants to avoid the formation of a prepolymer which tends to substantially increase the viscosity of the isocyanate component.

In a preferred embodiment the present invention further relates to a foamable composition comprising:
  a) a part A comprising an amount of 30 wt-% or greater of at least one hydrophobic polyol, at least one gelling agent, and at least one blowing agent; and
  b) a part B comprising at least one isocyanate.

Another aspect of the present invention is to provide a polyurethane foam composition that is substantially unaffected by variations in the concentration of blowing agent such as water. It is surmised that the hydrophobic agent and moisture form an equilibrium at the exterior surface of the foam limiting the further take-up of moisture.

The invention further relates to a method of repair or reinforcement of a structural member comprising the steps of:
  a) providing a structural member having a void;
  b) providing a foamable composition comprising a mixture of:
    i) a first part comprising at least one polyol, at least one gelling agent, and at least one blowing agent; wherein the first part comprises an effective amount of hydrophobic ingredients and
    ii) a second part comprising at least one isocyanate;
  c) applying the mixture to the void.

The composition initially has a relatively low viscosity upon mixing. However, the applicant surmises that the thixotropic nature of the polyamine causes the composition to attain the proper consistency for good repair or reinforcement almost immediately upon application. Since the consistency of the foam relies on a chemical reaction, the thixotropic nature of the composition, rather than merely the initial viscosity of the blended parts, the composition may be easily applied at temperatures ranging from about −20° F. (−29° C.) to about 120° F. (49° C.).

The invention further relates to a method of foaming a polyurethane composition underwater comprising the steps of:
a) providing a substrate submerged in an aqueous environment;
b) providing a polyurethane composition in an applicator having an exit port, said composition comprising:
   i) a first part comprising at least one polyol, at least one gelling agent, and at least one blowing agent; wherein the first part comprises an effective amount of hydrophobic ingredients, and
   ii) a second part comprising at least one isocyanate;
c) blending the first and second part to form a mixture;
d) submerging the exit port in said aqueous environment;
e) applying the mixture to said substrate.

DETAILED DESCRIPTION OF THE INVENTION

Figure 1:
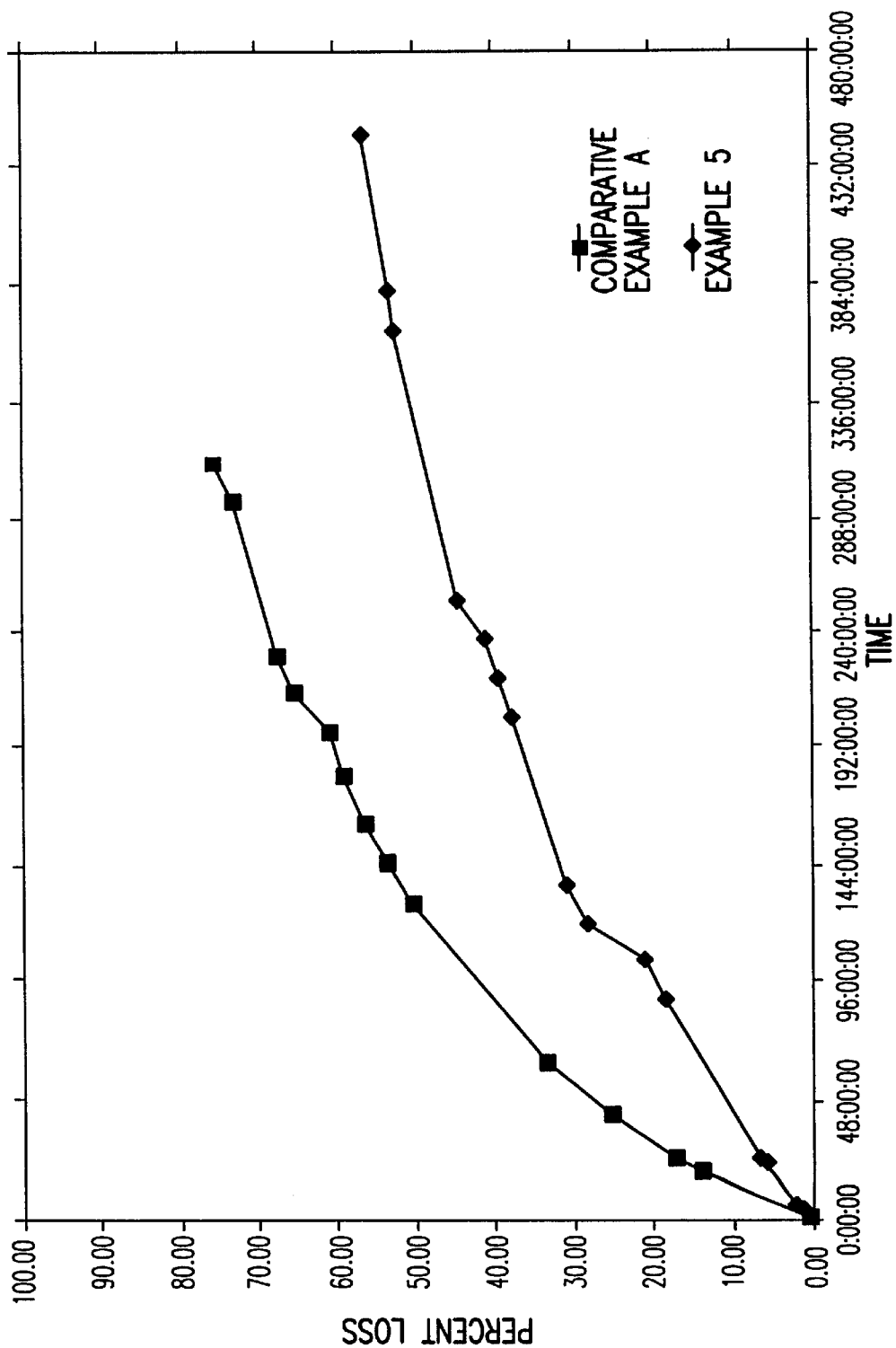
FIG. 1, titled "Ball Mill Demolition Test" depicts the resistance to erosion and impact and abrasion of Example 5 foamed at a density of about 18–22 lbs./ft$^3$ (0.29–0.35 kg/dm$^3$) an embodiment in accordance with the present invention and Comparative Example A. The foamable compositions of the present invention exhibit a percent loss 20% lower than Comparative A over the course of time tested representative of a 50% improvement in percent loss at 96 hours and about a 30% improvement at 288 hours.
Figure 2:
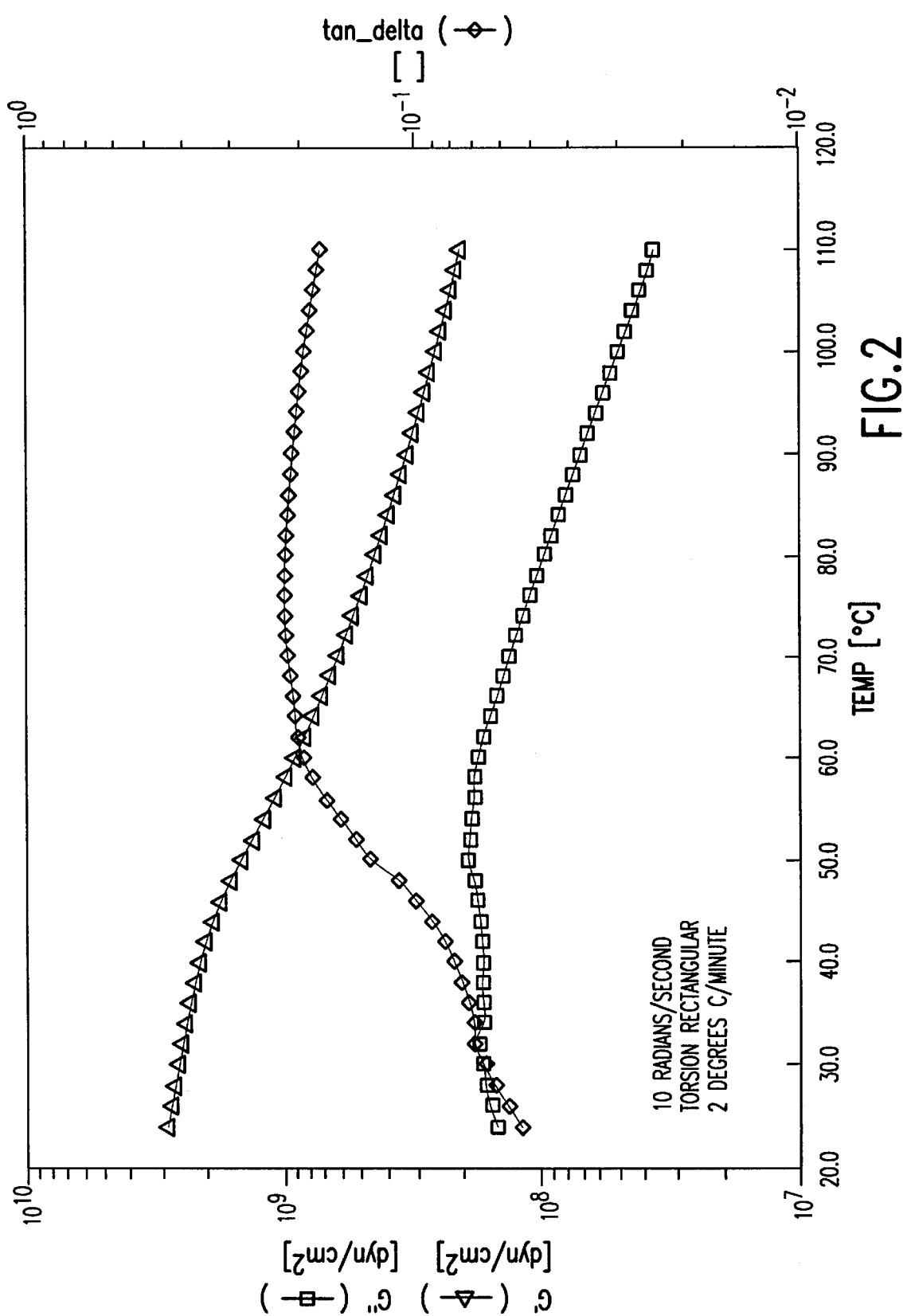
FIG. 2 depicts the storage modulus (G'), loss modulus (G"), and tan delta of Example 5 foamed at a density of about 18–22 lbs./ft$^3$ (0.29–0.35 kg/dm$^3$). The G' is related to the strength of the foam. The foamable compositions of the present invention are rigid, having a G' greater than $1\times10^6$ dynes/cm$^2$ over a temperature ranging from 20° C. to 100° C.

The term polyurethane foam as described herein is defined as a polymer containing at least two urethane groups including ureas, isocyanurates and biurets. More specifically, the foam of the present invention is a polyurethane-urea foam. "Hydrophobic" refers to those ingredients having a concentration of water at ambient temperature of less than 1% after being conditioned for 14 days at 100° F. (38° C.) and 95% relative humidity in a cylindrical container about 4 cm in height having an inside diameter of about 3 cm.

The foamable composition of the present invention comprises at least two parts. Upon mixing the two parts and exposing the mixture to environmental pressures and temperatures, the composition foams. Generally, each part is provided separately and mixed immediately prior to application. However, the invention also contemplates encapsulated ingredients, particularly encapsulated catalysts and/or isocyanates and/or gelling agents. In these embodiments, the composition may be provided as a single mixture.

The first part, part A, or polyol component comprises at least one polyol, at least one gelling agent, and at least one blowing agent. The polyol component comprises an effective amount of hydrophobic ingredients such that the density of the foam differs by no more than 10 lbs./ft$^3$ (0.16 kg/dm$^3$) preferably by no more than 5 lbs./ft$^3$ (0.08 kg/dm$^3$) when foamed in the presence of water in comparison with being foamed dry. The amount of hydrophobic ingredients present in the polyol component is typically at least 20 wt-%, preferably about 30 wt-% or greater, more preferably about 40 wt-% or greater, even more preferably about 50 wt-% or greater and most preferably greater than 60 wt-%. The applicant surmises that the relatively high concentration of hydrophobic ingredients in combination with the formation of a gel is what contributes to the characteristic that the composition is essentially unaffected by high concentrations of water. In the absence of a gelling agent, there tends to be a substantial difference in the foam density achieved at dry conditions in contrast to wet conditions. Since water is a common blowing agent, the rate of expansion of foamable compositions typically directly relates to the concentration of water present. Hence, as the concentration of water increases, polyurethane compositions in the absence of the gelling agent tend to froth, rather than produce a consistent foam.

The first part or part A of the foamable composition of the present invention comprises at least one polyol. For the preparation of rigid foams the polyol(s), in general, have a molecular weight of 50 to 4000, a functionality of 2–8 and a hydroxyl number, as determined by ASTM designation E-222-67 (Method B), in a range from about 14 to about 1800, preferably from about 50 to about 500, and more preferably from about 100 to 200.

Polyols and methods for their preparation are known. For the purpose of the present invention, a "polyol" is an ingredient having at least two active hydrogen atoms. The term "active hydrogen atom" refers to hydrogens which display activity according to the Zerewitnoff test as described by Kohlerin, *Journal of American Chemical Society*, Vol. 49, pp 31–81 (1927). Useful polyols include polyethers, polyesteramides, polythioethers, polycarbonates, polyacetals, polyolefins, and polysiloxanes.

The preferred polyols are hydrophobic including various grades of castor oil, ricinoleate polyols (highly refined castor oil) and derivatives thereof. Castor oil, also known as ricinus oil, is a triglyceride (ester) of fatty acids derived from the seed of the castor plant. Approximately 90% of the fatty acid content is ricinoleic acid, an 18 carbon acid having a double bond in the 9–10 position and a hydroxyl group on the 12$^{th}$ carbon. The remainder of castor oil is made up of dihydroxystearic acid (0.7%), palmitic acid (1%), stearic acid (1%), oleic acid (3%), linoleic acid (4.2%), linolenic acid (0.3%) and eicosanoic acid (0.3%). Castor oil is available in a variety of grades from several suppliers.

Other suitable polyols include ethylene glycol, propylene glycol, diethylene glycol, dipropylene glycol, 1,4-butanediol, 1,6-hexanediol and mixtures thereof. The polyol is present in the first part or part A at a concentration ranging from about 5% by weight to about 95% by weight, preferably from about 10% by weight to about 80% by weight, more preferably from about 20% to about 80% by weight, even more preferably from about 40% to about 80%, and most preferably from about 50% to about 80% based on the total weight of the first part (part A). It is surmised that low molecular weight polyol(s) act as hard segments within the polyurethane foam to increase rigidity. Alternatively or in addition to the low molecular weight polyol(s), higher molecular weight polyols may also be employed. Preferably, the polyol component comprises at least one short chain extender to increase toughness. Short chain extenders are known in the art and include polyols such as ethylene gylcol, dipropylene glycol, and glycerin.

In addition to or in the alternative, higher functional polyols having more than two hydroxyl groups per molecule may be employed in the part A component. Examples include glycerol, trimethylolpropane, 1,2,4-butanetriol, 1,2,6-hexanetriol and mixtures thereof. The higher functional polyol may be present in the part A component in a range of from about 5% by weight to about 20% by weight, and preferably from about 10% by weight to about 15% by weight based on total weight. Such materials react to provide rigid polyurethane foams having increased crosslinked densities.

The first part (part A) of the composition of the present invention comprises at least one gelling agent. Any material which will thicken the mixture, particularly at the interface which contacts the substrate or water, to the extent that the isocyanate component is substantially prevented from reacting with excess environmental water is suitable for use as the gelling agent. Suitable gelling agents include peroxides, polyamides, and preferably polyamines. The polyamine is typically a primary or secondary amine and present in the first part (part A) component in a range from about 0.1% by weight to about 5% by weight, and preferably from about 0.5% by weight to about 2 to 3% by weight based on the total weight of the polyol component. Upon mixing the polyol and isocyanate component, the composition typically gels within 1 minute, preferably in about 15 seconds or less, more preferably in about 10 seconds or less, and most preferably in about 5 second or less when mixed and applied by meter-mix application equipment.

It is surmised that the polyamine acts as a chemical thixotrope to provide an instant gel once the parts are blended together. It is further surmised that the instant formation of a gel enhances the sealing characteristics of the foam. For example, vacant spike holes often create voids within a railway tie that can pass completely through the tie. As the inventive foamable composition is injected into the hole, the thixotropic gelling action provided by the polyamine allows the composition to more readily adhere to the inner surface of the hole. Thus, the composition foams within the void to adequately seal the hole. In the absence of the polyamine, the composition is more likely to flow through the hole and/or cracks and provide an inadequate seal once foamed. Alternatively, in the absence of a gelling agent, the ingredients for each part may be selected such that the composition is sufficiently high enough in viscosity upon mixing without a thixotropic ingredient. However, this is much less desirable since the initial high viscosity causes the composition to be more difficult to apply consistently, particularly at low application temperatures.

The structure or type of polyamine is selected on the basis of the desired gel rate. In general, the polyamine may be monomeric or polymeric, having a functionality of 2 or greater. Linear aliphatic polyamines result in the fastest rate of gelation, whereas cycloaliphatic polyamines produces a slightly slower gel rate and aromatic polyamines even slightly slower. However, even the relatively "slow" aromatic polyamine results in the formation of a gel in less than about 15 seconds when applied by meter-mix equipment. For automated application means, aliphatic and cycloaliphatic polyamines are preferred whereas the aromatic polyamines are preferred for hand applied application equipment. Preferably, the molecular weight of the polyamine ranges of from about 100 grams/mole to about 400 grams/mole. Examples of useful polyamines include ethylene diamine, tolylene diamine, diaminodiphenyl-methane and polymethylene polyphenylene polyamine; polyamides and aminoalcohols, for examples ethanolamine and diethanolamine. Preferred aromatic amines include 4,4'-diamino-diphenyl methane, 3,5-diethyl-2,4-tolylene diamine (DETDA), and Hardener HY-450, a 4,4'-methylene bis (2-ethyl-benzamine) available from Ciba Geigy. For faster gel rates cycloaliphatic amines such as AMICURE PACM, a bis-(p-aminocyclohexyl) methane, available from Air Products and Chemicals & Inc. are preferred, whereas linear aliphatic amines such as JEFFAMINE, available from Huntsman Chemical Corp (Houston, Tex.) are surmised to gel the fastest.

The foamable composition as a whole necessarily comprises at least 20% by weight of hydrophobic ingredients. Preferably, the amount of hydrophobic ingredients is greater than 30%, more preferably greater than 40%, even more preferably greater than 50% and most preferably about 60 wt-% or greater. In embodiments wherein the hydrophobic ingredient(s) are primarily contributed by the polyol portion, the first part (part A) will comprise at least about 50% by weight, preferably at least about 60% by weight, and more preferably from about 70% to about 95% by weight hydrophobic ingredients, based on the total weight of part A. The polyol itself may be the sole hydrophobic component, as in the case wherein relatively high concentrations of castor oil are employed and/or additional hydrophobic ingredients may be employed. A preferred hydrophobic additive is a monofunctional alcohol such as dinonyl phenol. Additional hydrophobic agents include fuel oils such as diesel fuel, paraffin waxes, animal or vegetable oils, and the like.

The high concentration of hydrophobic ingredients in combination with the gelling agent allows the foamable composition to be injected into an aqueous environment. For example, vacant spike holes often contain pooled water which increases the foaming and decreases the foam density which can be detrimental. Foamable compositions having increased hydrophobicity are less likely to emulsify and/or entrap water which can result in reducing the foam rigidity and adhesion characteristics.

The foamable composition of the present invention comprises at least one blowing agent typically present in the first part (part A) component. The preferred blowing agent is water which is added at an amount ranging from about 0.5% by weight to about 1% by weight, and preferably from about 0.15% by weight to about 0.5% by weight, based on the total weight of Part A. In many instances, the polyol component and or hydrophobic ingredients contain a small concentration of residual moisture or water at a sufficient concentration to act as a blowing agent. Accordingly, the blowing agent may be inherently present and thus need not be separately added.

The foamable composition of the present invention comprises at least one isocyanate, employed in the second part or part B component. Any of a wide variety of organic polyisocyanates compositions may be employed in the isocyanate component, including monomeric and/or polymeric polyisocyanates which may be linear, branched, cyclic aliphatic polyisocyanates, cycloaliphatic polyisocyanates, aromatic polyisocyanates, isocyanate-terminated prepolymers, isocyanurates and mixtures thereof. Representative examples include 2,4-toluene diisocyanate (TDI), diphenyl methane diisocyanate (MDI), m-phenylene diisocyanate, 4-chlor-1,3-phenylene diisocyanate, 4,4'-biphenyl diisocyanate, 1,5-naphthalene diisocyanate, 1,4-tetramethylene diisocyanate, 6-hexamethylene diisocyanate, 1,10-decamethylene diisocyanate, 1,10 decamethylene diisocyanate, 1,4-cyclohexylene diisocyanate, 4,4'-methylene-bis(cyclohexyl isocyanate) and others. Further, the isocyanate compound may contain other substituents which do not substantially detract from the reactive natures of the isocyanate groups. It is preferred to use a blend of two or more isocyanates wherein at least one of the isocyanates is aromatic. Aromatic diisocyanates, those which have at least two isocyanate groups directly attached to an aromatic ring, react in the urethane reaction more rapidly with polyols than the aliphatic isocyanates. The preferred isocyanates are polymeric MDIs s including polymethylene polyphenyl isocyanates containing 4,4'methylene bisphenyl isocyanate commercially available from The Dow Chemical Company, Midland, Mich. as PAPI 2027, PAPI 2020 and PAPI 2901; from ICI as Rubinate M, Rubinate 9257, and Rubinate 9258; and from Bayer as Modur MR, MR-200 and MRS-10. Preferably, the isocyanate component is substantially free of isocyanate reactants to avoid the formation of a prepolymer which tends to substantially increase the viscosity of the isocyanate component.

The isocyanate is present in the second part (part B) component in a range up to about 100% by weight. Preferably, the isocyanate is employed at a concentration from about 85% by weight to about 99% by weight, and more preferably from about 94% by weight to about 97% by weight based on total weight of the part B.

At least one plasticizer is preferably used in the polyol component (part A) and/or isocyanate component (part B) to enhance the flow characteristics by reducing the viscosity. Suitable plasticizers include polymeric resins, elastomers, waxes, oils and mixtures thereof. Specific examples include phthalate esters, alkyl phosphates, polyphenyls, di- and triphenyl compounds as well as partially hydrogenated versions, aromatic oils, chlorinated waxes or paraffins, adipate esters, synthetic rubber polymer, natural oils, rosin and rosin derivatives, and polysulfide rubber. A preferred plasticizer is Eastman TXIB Plasticizer (Eastman Chemical Company, Kingsport, Tenn.), a 2,2,4-trimethyl-1,3-pentanediol diisobutyrate plasticizer. The plasticizer may be present in either part in a range of from about 1% by weight to about 25% by weight, and preferably from about 5% by weight to about 10% by weight, with respect to the total weight of each part. The addition of a plasticizer to the part A and/or part B components is preferred to improve the flow characteristics during the railroad tie repair operation.

Preferably the ingredients are selected to lower the crystallization temperature of each component to improve the freeze-thaw stability. For example, the railroad industry repairs tracks year round, and fluctuations in temperature, especially during low temperatures, prefer that each part flow without additional heat at reduced temperatures. Additionally, the isocyanate used in the part B component may tend to crystallize under cooler temperatures so the addition of a plasticizer allows enhanced processing characteristics.

The viscosity of each part of the foamable composition of the present invention is preferably as low as possible at as low of a temperature as possible. Accordingly, each part of the foamable composition of the present invention has a (24 hours) viscosity of less than about 10,000 cPs, preferably less than about 5,000 cPs, more preferably less than about 2,000 cPs, at most preferably less than about 1,000 cPs at a temperature of about 50° F. (10° C.) or less. Preferably, each part of the foamable composition exhibits the desired viscosity at a temperature of less than about 40° F. (4° C.), more preferably at less than about 30° F. (−1° C.) and most preferably at about 20° F. (−7° C.) or less. The inventive foamable composition of the present invention is preferably applied at a temperature at which the viscosity is about 1,000 cPs or less. Due to the relatively flat viscosity curve, the composition of the present invention are more user friendly, being able to be applied over a relatively wide temperature range. For best results, the composition is applied at a temperature from about 70° F. (21° C.) to about 100° F. (38° C.), with about 90° F. (32° C.) being most preferred.

In order to be applied over a wide temperature range and not require any special handling, it is preferred that each part of the foamable composition of the present invention exhibits freeze-thaw stability meaning that freezing and rethawing of the components has no substantial detrimental effect on the processability nor the properties of the resulting foam. Preferably, each part is a stable liquid at temperatures below 30° F. (−1° C.), more preferably below 10° F. (−12° C.), even more preferably below 0° F. (−18° C.), even more preferably at about −10° F. (−23° C.) or less and most preferably at about −20° F. (−29° C.) or less.

The rate of reaction of the composition of the invention after mixing the polyol component with the isocyanate component can be accelerated by the incorporation of effective amounts of catalysts to promote the active hydrogen atom/isocyanate reaction. Suitable catalysts are those which are known to enhance the polyol/isocyanate reaction, water/isocyanate reaction, urethane/isocyanate reaction and urea/isocyanate reaction. Preferably, a combination of catalysts are employed to accelerate formation of urethane linkages as well as the isocyanurate linkages. The applicants surmise that the finished foam is comprised of a variety of linkages including isocyanurate, biuret and urea linkages rather than predominantly urethane linkages.

Catalysts are typically employed in amounts ranging from about 0.1% by weight to about 5% by weight, and preferably from about 0.3% by weight to about 3% by weight, based on the total weight of part A. Catalysts include organic amine compounds and organo metallic compounds and mixtures thereof which are typically present in the polyol component (Part A) for stability purposes. Further, the catalyst may be employed in combination with various accelerators and/or curing agents such as Lewis Base catalysts including ANCAMINE K.54 (Pacific Anchor Chemical Corporation, Los Angeles, Calif.), a tris-(dimethylaminomethyl) phenol.

The amine based catalysts differ from the polyamine gelling agent with respect the number of reactive sites present as well as with respect to the concentration employed. Whereas amine based catalysts are typically tertiary amines, the polyamine gelling agent is typically a primary or secondary amine. Hence, the polyamine gelling agents are a reactant that is incorporated into the foam rather than added for the purpose of propagating the reaction, as in the case of catalysts.

Specific examples of useful catalysts to promote the urethane reaction include dibutyltindilaurate, stannous octoate, tertiary aliphatic and tertiary alicyclic amines including triethylamine, triethanolamine, tri-n-butylamine, triethylenediamine, alkylmorpholene, etc. Complex mixtures of such catalysts and modified forms may also be employed.

For the promotion of the isocyanurate reaction, preferably specific types of catalysts are used such as Polycat 41 (N, N, N', N', N", N"-hexamethyl-1,3,5-triazine 1,3,5 (2H, 4H, 6H tripropanamine), Polycat 43 (a proprietary tertiary amine) and various catalysts based on potassium salts of organic acids including DABCO T-45 (potassium octonate in dipropylene glycol (DPB) (60/40), DABCO K-15 (potassium octonate in DPG (70/30), METACURE T-120 (organo tin catalyst (17.5% tin) exhibiting high catalytic activity), and Polycat 46 (potassium acetate in ethylene glycol). The Polycat and DABCO catalysts are supplied by Air Products & Chemicals, Inc. (Allentown, Pa.). Most preferred are combinations of isocyanurate reaction catalysts. For example, a slower reacting trimer catalyst such as DABCO TMR-2 and DABCO TMR-3 (quaternary ammonium salts) and DABCO TMR-30 (2,4,6-tris(dimethylaminomethyl) phenol) may be employed and preferably in combination with a stronger trimer catalyst. Alternatively, combinations of suitable strong trimer catalysts and a small amount of urethane catlyst, such as DABCO 33 LV (triethylene diamine in DPG (33/67) and a metal based catalyst like DABCO T-12 (dibutyltin dilaurate) may also be employed. These catalyst systems are preferred to minimize initial foaming as described in U.S. Pat. No. 5,556,934 issued Sep. 17, 1996, incorporated herein by reference.

Other characteristics of the polyurethane foam can be modified with additives commonly used in polyurethane foam compositions including fillers and extenders as well as ultraviolet (UV) stabilizers, antioxidants, fungicides, bactericides, surfactants, dyes and mixtures thereof.

The polyurethane composition can be made in accordance with known manufacturing methods. The polyol component and isocyanate component are individually prepared using commonly available blending and mixing techniques. The inventive two-part foamable composition is most effectively used by mixing and applying the composition using automated impingement equipment that blends the packages at an appropriate ratio. In such processes, the components are meter mixed together at a ratio of active hydrogen atoms (part A) to isocyanate group (part B) in a range of from about 1:1 to about 1:4, and preferably at a ratio of about 1:3. Hence, excess isocyanate is preferred.

In the repair of a railroad tie, the composition of the invention is preferably preheated to a temperature ranging from about 80° F. (27° C.) to about 120° F. (49° C.) and applied into the spike hole using an automatic mixing and application unit that is part of a track repair process that can remove the spike and spike plate, lift or replace the railroad tie, and repair the spike holes using the polyurethane composition of the invention, followed by replacement of the spike plate and rail and respiking the assembly together.

The inventive composition of the present invention is also useful for reinforcement of composite structural members including building materials such as doors, windows, furniture and cabinets and for well and concrete repair. The composition can be used to fill any unintended gaps, particularly to increase the strength. Structural components are formed from a variety of materials such as wood, plastic, concrete and others, whereas the defect to be repaired or reinforced can appear as cuts, gaps, deep holes, cracks, etc. The foamable composition of the present invention is also surmised to be useful for other applications where forming a foam in an aqueous environment is of importance as for example in the repair of cushioning for docks.

A foam mass can be prepared by combining the polyol component, being substantially free of urethane prepolymer with an isocyanate component. The foam may be open or closed cell exhibiting a uniform cell structure which may collapse on the surface forming a skin. Further, the resulting foam, particularly for use in railroad repair, can be characterized as follows:

|  | Useful | Preferred | Most Preferred |
| --- | --- | --- | --- |
| Foam Density | >5 lbs./ft$^3$ | >10 lbs./ft$^3$ | 15 – 30 + lbs./ft$^3$ |
| Strength (G') | >1 × 10$^7$ dynes/cm$^2$ | >1 × 10$^7$ dynes/cm$^2$ | >1 × 10$^8$ dynes/cm$^2$ |
| Demolition Test (96 hours) | <40% loss | <30% loss | <20% loss |

The foam density does not change substantially when foamed in wet environments in comparison to dry. Preferably, the difference in foam density is no greater than about 10 lbs./ft$^3$ (0.16 kg/dm$^3$) more preferably no greater than about 5 lbs./ft$^3$ (0.08 kg/dm$^3$) and most preferably a difference of no greater than about 3 lbs./ft$^3$ (0.05 kg/dm$^3$).

Test Methods

Melt Viscosity

Melt viscosity is determined in accordance with the following procedure using a Brookfield Laboratories DVII+ Viscometer. The spindle used is a RV Spindle Set, suitable for measuring viscosities in the range of from 10 to 100,000 centipoise. The viscometer apparatus is lowered and the spindle submerged in the sample tested.

Lowering is continued until the spindle line is atop the sample. The viscometer is turned on, and set to a shear rate which leads to a torque reading in the range of 30 to 60 percent. Readings are taken every half minute for about 2 minutes, or until the values stabilize, which final reading is recorded.

The initial viscosity is tested immediately after preparation of the polyol or isocyanate component and is often considerably higher than the viscosity after 24 hours. The viscosity after 24 hours is representative of the viscosity during usage. Hence reference to viscosity refers to the 24 hour viscosity unless stated otherwise.

Density or Dry Density is determined either by a water displacement method or by foaming the composition directly into an empty container of a known mass and volume.

Wet Density is determined by the same method as the dry density except the compositions if foamed directly into a water bath or water-filled container.

Dynamic Mechanical Analysis

A temperature sweep was conducted in accordance with ASTM-D4440-93 on the foam employing torsion rectangular geometry and a frequency of 10 radians/second and a temperature ramp of 2° C./minute. The storage modulus (G'), loss modulus (G') and tan delta were plotted over the desired temperature range.

Ball Mill Demolition Test

The test is used to determine the resistance to erosion by impact and abrasion. The results are expressed as a percent loss after a period of time, typically after 100 hours. A ball mill of the type commonly used to grind pigments is employed having an external dimension of approximately 5.5"±2" in height having a 5.5"±1" diameter. The ball mill contains thirty-three rounded cylindrical balls approximately ¾"±¼" in height and ¾"±¼" in diameter. Ten plugs of the sample to be tested are prepared which are similar in size to balls in the ball mill. The total weight of the sample plugs is recorded to the nearest 0.1 gram. Predust the clean ball mills balls with small pieces of the sample to be tested for at least 2 hours. Empty the ball mill of all dust that can easily be shaken out. Place the sample plugs along with dusted balls into the ball mill. Seal and roll the ball mill on a paint roller or similar device at 50 rpm±5 rpm. Every 12–24 hours, stop the ball mill, remove the plugs, blow off any dust that can be removed with compressed air and weight the samples to the nearest 0.1 g. Determine the percent loss by subtracting the eroded weight from the initial weight and dividing the difference by the initial weight X 100%.

The following examples were prepared in accordance with the following general procedure:

The "polyol", part A or first part component is prepared by adding all the ingredients to a Cowles dissolver at room temperature and agitating until the mixture is completely homogeneous. For examples that include small concentrations of catalysts or other ingredients, it is also advantageous to make a preblend of the polyamine and the ingredient employed in small concentrations.

If a single isocyanate is employed without any further ingredient no additional preparation is required. In the instances when the "iso", part B, or second part also comprises a plasticizer mixed or reacted with the isocyanate, the ingredients are added to a Cowles dissolver and agitated until the mixture is completely homogeneous.

Each part is packaged separately in an appropriate manner.

Tables I, II and III represent various "polyol" or part A components whereas Table IV represents several "iso" or part B components. The castor oil, hydroxyl terminated polybutadiene resin, and dinonylphenol a monofunctional alcohol are hydrophobic ingredients, whereas the polyether polyols, short chain extenders, isocyanates and Eastman TXIB plasticizer are not hydrophobic. The present invention encompasses all possible combinations of polyol components and isocyanate components in accordance with the claims.

The following observations and or physical properties were obtained upon combining the polyol component and isocyanate component at a 1 to 1 mix ratio.

EXAMPLE 1

Polyol 1 was reacted with Iso B resulting in a foam having a wet density @120° F. (49° C.) of 16 lbs./ft$^3$ (0.26 kg/dm$^3$) and a dry density of 27 lbs./ft$^3$ (0.43 kg/dm$^3$).

EXAMPLE 2

Polyol 6 was reacted with uncompounded Papi 2027 isocyanate producing a foam.

EXAMPLE 3

Polyol 8 was reacted with Iso H resulting in a gel time of 15 seconds and a foam density of 23 lbs./ft$^3$ (0.37 kg/dm$^3$).

EXAMPLE 4

Polyol 9 was reacted with Iso K and placed in a mold. The samples were put in an oven for 2 hours at 158° F. (70° C.). The sample was then Azod impact tested resulting in an average strength of 0.228 ft lbs. (−blank 0.045)=0.183 ft lbs.

EXAMPLE 5

Polyol 11 was modified decreasing the castor oil content by 1 wt-%, increasing the Dabco T-120 catalyst to 1.2 wt-%, increasing the Ancamine K-54 to 0.4 wt-%, and replacing the HY-450 aromatic amine with Amicure PACM. The polyol has an initial viscosity of 1200 cPs, and a 24 hour viscosity of 250 cPs. The polyol was reacted with Iso K to produce a foam.

The viscosity profile for the polyol component and iso component was as follows:

|  | Part A/Polyol | Part B/Iso |
|---|---|---|
| 20° F. (−7° C.) | 6000 cPs | 10,000 cPs |
| 30° F. (−1° C.) | 3500 cPs | 5000 cPs |
| 40° F. (4° C.) | 2000 cPs | 2500 cPs |
| 50° F. (10° C.) | 1000 cPs | 1250 cPs |
| 60° F. (16° C.) | 500 cPs | 500 cPs |

EXAMPLE 6

Polyol 14 was reacted with Iso A to produce a foam having an initial wet density of 24.1 lbs./ft$^3$ (0.386 kg/dm$^3$) and a dry density of 28.1 lbs./ft$^3$ (0.450 kg/dm$^3$). The next day another foam sample was made in which the wet density was 21.1 lbs./ft$^3$ (0.338 kg/dm$^3$) and the dry density was 24.4 lbs./ft$^3$ (0.390 kg/dm$^3$). The viscosity of the Polyol component was 310 cPs initially and stable at 260 cPs after 1 and 2 days. The moisture content of the Polyol component was measured to be 0.4319% initially, 0.4012% after 1 day and 0.3649% after 2 days.

EXAMPLE 7

Polyol 14 was modified by replacing 3 wt-% of the castor oil with 3 wt-% ethylene glycol and reacted with Iso A to produce a foam having an initial wet density of 14.5 lbs./ft$^3$ (0.232 kg/dm$^3$) and a dry density of 21.9 lbs./ft$^3$ (0.350 kg/dm$^3$). The next day another foam sample was made having a wet density of 20.3 lbs./ft$^3$ (0.325 kg/dm$^3$) and a dry density was 24.6 lbs./ft$^3$ (0.394 kg/dm$^3$). The viscosity of the Iso component was 140 cPs initially and stable at 120 cPs after 1 and 2 days.

EXAMPLE 8

The modified Polyol 14 of Example 7 was also reacted with Iso K producing a foam having an initial wet density of 16.0 lbs./ft$^3$ (0.256 kg/dm$^3$) and a dry density of 21.5 lbs./ft$^3$ (0.344 kg/dm$^3$). The next day another foam sample was made having a wet density of 16.7 lbs./ft$^3$ (0.267 kg/dm$^3$) and a dry density was 22.5 lbs./ft$^3$ (0.360 kg/dm$^3$). The viscosity of the Polyol component was consistent with Example 5 in that the viscosity decreased slightly within the first 24 hours and then stabilized accompanied by a decreasing moisture content trend. Surprisingly the change and moisture content had essentially no effect on the foam density.

EXAMPLE 9

Polyol 16, having an initial viscosity of 270 cPs was reacted with Iso K producing a foam.

EXAMPLE 10

Polyol 22 was reacted with Iso K producing a foam.

EXAMPLE 11

Polyol 23 was reacted with Iso J resulting in a foam having a wet density of 18.2 lbs./ft$^3$ (0.291 kg/dm$^3$) and a dry density of 29.0 lbs./ft$^3$ (0.464 kg/dm$^3$).

EXAMPLES 12–17

Polyol 25, having a initial viscosity of 2000 cPs was reacted with uncompounded Papi 2027 isocyanate resulting in a 20 second gel rate. The composition was used to produce foam under dry conditions with railroad tie test equipment available from Tamper at temperatures ranging from ambient temperature (77° F. (25° C.)) to 125° F. (52° C.) under a variety of test conditions as follows.

| Pressure | Nozzle | Temp. (° F.) | Density (lbs./ ft$^3$) |
|---|---|---|---|
| standard | #20 | 115 (46° C.) | 24.9 (.398 kg/dm$^3$) |
| standard | #40 | 120 (49° C.) | 24.4 (.390 kg/dm$^3$) |
| standard | #20 | 125 (52° C.) | 26.6 (.426 kg/dm$^3$) |
| 40 lbs. | #30 | 120 (49° C.) | 25.6 (.410 kg/dm$^3$) |
| standard | #40 | 77 (25° C.) | 31.5 (.504 kg/dm$^3$) |
| 50 lbs. | #30 | 125 (52° C.) | 26.7 (.427 kg/dm$^3$) |
| standard | #30 | 125 (52° C.) | 26.7 (.427 kg/dm$^3$) |
| standard | #30 | 125 (52° C.) | 25.5 (.408 kg/dm$^3$) |
| standard | #20 | 77 (25° C.) | 29.2 (.467 kg/dm$^3$) |
| standard | #15 | 77 (25° C.) | 32.4 (.518 kg/dm$^3$) |

The foam density was found to be very consistent through-out this temperature range, particularly when the same size nozzle was employed.

Jeffamine 400 and 403 were added individually to Polyol 25 and reacted with uncompounded Papi 2027 isocyanate to decrease the gel rate as follows:

| Jeffamine 0-400 | Jeffamine T-403 |
|---|---|
| 1 wt-% - 14 seconds | 1 wt-% - 13 seconds |
| 2% - 13 seconds | 2% - 12 seconds |
| 3% - 11 seconds | 3% - 11 seconds. |

EXAMPLE 18

Polyol 29, having an initial viscosity of 490 cPs, was reacted with Iso F, having an initial viscosity of 470 cPs resulting in a foam having a density of 13.5 lbs./ft$^3$ (0.216 kg/dm$^3$) at 120° F. (49° C.) and a density of 12.7 lbs./ft$^3$ (0.203 kg/dm$^3$) at a higher temperature.

EXAMPLE 19–21

Polyol 31 was reacted with Iso A resulting in a foam having a wet density of 18.7 lbs./ft$^3$ (0.299 kg/dm$^3$) and a dry density of 23.3 lbs./ft$^3$ (0.373 kg/dm$^3$). The viscosity of each component was measured as follows:

| Temp. (° F.) | Polyol Viscosity | Iso Viscosity |
|---|---|---|
| 10 (−12° C.) | 3400 | 2800 |
| 30 (−1° C.) | 1700 | 990 |
| 40 (4° C.) | 1230 | 840 |
| 60 (16° C.) | 530 | 290 |
| 77 (25° C.) | 285 | 170 |
| 90 (32° C.) | 190 | 105 |
| 0 (18° C.) | 5600 | |
| 15 (−9° C.) | 2650 | |
| 20 (−7° C.) | | 1200 |

Polyol 31 was combined with 1 wt-% zinc stearate and reacted with Iso A to produce a foam having a dry density of 19.9 lbs./ft$^3$ (0.318 kg/dm$^3$) and a wet density of 10.2 lbs./ft$^3$ (0.163 kg/dm$^3$).

Polyol 31 was also reacted with Iso A at ambient temperature with 60 lbs. of pressure resulting in a wet density of 16.5 lbs./ft$^3$ (0.264 kg/dm$^3$) and a dry density of 19.2 lbs./ft$^3$ (0.307 kg/dm$^3$).

EXAMPLE 22

Polyol 33, having an initial viscosity of 1325 cPs was reacted with Iso K resulting in a gel time of 20 seconds and a density of about 25 lbs./ft$^3$ (0.40 kg/dm$^3$).

EXAMPLE 23

Polyol 36 was reacted with Iso H resulting in a gel time of 20 second and a foam having an initial density of 15.6 lbs./ft$^3$ (0.250 kg/dm$^3$).

EXAMPLE 24

Polyol 37 was reacted with uncompounded Papi 2027 to produce a foam.

EXAMPLE 25

Polyol 38, having an initial viscosity of 460 cPs at ambient temperature and a viscosity of 6400 cPs at 0° C., was reacted with Iso F, having an initial viscosity at ambient temperature of 440 cPs and a viscosity of 5600 cPs at 0° C. The composition had a gel time of 20 seconds at ambient temperature and 50 seconds at 0° C.

EXAMPLE 26

Polyol 40 was reacted with Iso C resulting in a foam having a dry density at 130° F. (54° C.) of 20.8 lbs./ft$^3$ (0.333 kg/dm$^3$).

EXAMPLE 27

Polyol 40 was reacted with Iso F resulting in a foam having a dry density at 130° F. (54° C.) of 28.7 lbs./ft$^3$ (0.459 kg/dm$^3$) and a wet density of 21.9 lbs./ft$^3$ (0.350 kg/dm$^3$).

EXAMPLE 28

Polyol 43 was modified with the addition of 6.2 wt-% Voranol 230-660 and 2.0 wt-% AMICURE PACM gelling agent. The polyol component, having an initial viscosity of 240 cPs, was reacted with Iso K to produce a less rigid foam. The dry density was 19.3 lb/ft$^3$ (0.309 kg/dm$^3$) whereas the wet density was 29.3 lb./ft$^3$ (0.469 kg/dm$^3$). Although this material is surmised not to have sufficient strength to be suitable for repair of railroad ties, it would be suitable for other applications such as cushioning for docks.

TABLE I

| Table 1 Ingredient | Trade Name (Supplier, Location) | Generic Chemical Description | 1 | 2 | 3 | 4 | 5 | 6 | 7 | 8 | 9 | 10 | 11 |
|---|---|---|---|---|---|---|---|---|---|---|---|---|---|
| Polyols | Castor Oil AA | castor oil | | | 96 | | 95 | 78.975 | 23 | | | 29.6 | |
| | #1 Castor | castor oil | 71.8 | 65.4 | | 92.625 | | | | 72.75 | | | 57.3 |
| | D B Castor | castor oil | | | | | | | | | 62.4 | | |
| | Voranol 230–238 | triol polyether polyol EW 236 | | | | | | | 16.2 | | | 15 | |
| | Voranol 240–770 | 4-functional amine based polyether polyol | | | | | | | 29.4 | | | 29.3 | |
| | Poly BD 605 | hydroxyl terminated polybutadiene resin | | | | | | | 10 | | | | |
| Blowing Agent | Water | water | | 0.2 | 0.175 | 0.2 | 0.175 | 0.3 | | | 0.2 | | |
| Catalysts | Ancamine K-54 | tertiary amine | | 0.4 | | | | | | | 0.4 | | 0.4 |
| | Dabco 33-LV | tertiary amine in DPG | | | | | | | 1.5 | | 2 | | |
| | Dabco T-120 | tin catalyst | 0.2 | 0.5 | | 0.3 | 0.2 | 0.2 | 0.5 | 0.27 | 0.5 | | 0.6 |
| | Polycat 41 | tertiary amine | 2 | 1.5 | 0.45 | 2.25 | 1.35 | 2.25 | | 2.025 | 1.5 | | 1.5 |
| | Polycat 43 | tertiary amine | 0.2 | 0.2 | 0.05 | 0.25 | 0.15 | 0.25 | | 0.2025 | 0.2 | | 0.2 |
| Additives | Harcross BK-5099 | black iron oxide | 0.5 | | 0.6 | 0.6 | 0.6 | 0.6 | 0.6 | 0.54 | | 1.2 | |
| | Nigrosine Base S | black dye | 0.3 | 0.5 | 0.2 | 0.3 | | 0.3 | | 0.27 | | | |
| Plasticizers | DNP-Dinonylphenol | hydrophobic monofunctional alcohol | 9 | 5 | | | | | | 9 | 5 | | 5 |
| | Tergitol NP-9 | modified nonyl phenol | | | | | | | | | | | |
| | TXIB | plasticiser | 10.5 | 20 | | | | | 10 | 10 | 20 | 10 | 17 |
| | Krumbhaar K-1717 | polyketone resin | | | | | | 12.75 | | | | | |

TABLE I-continued

| Table 1 Ingredient | Trade Name (Supplier, Location) | Generic Chemical Description | 1 | 2 | 3 | 4 | 5 | 6 | 7 | 8 | 9 | 10 | 11 |
|---|---|---|---|---|---|---|---|---|---|---|---|---|---|
| Short Chain Extenders | Ethylene Glycol | ethylene glycol | 2 | 3 | 1 | 2 | 0.5 | 2 | 5 | 1.8 | 6 | 8 | |
| | Dipropylene Glycol | dipropylene glycol | | | | | | | | 2 | | 3.2 | 14 |
| | 99.5% Glycerin | 99.5% glycerin | | | | | | | | | | | |
| | 99.7% Glycerin | 99.7% glycerin | | | | | 0.5 | | | | | | |
| Surfactants | Dow Corning DC-193 | silicone glycol | 1.5 | 1.5 | 1.5 | 1.5 | 1.5 | 1.5 | 1.5 | 1.35 | 1.5 | 1.5 | 1.5 |
| Gelling Agent | Hardener HY-450 | aromatic amine | 2 | 2 | | | | 1 | | 1.8 | 2 | | 2 |
| Gelling Agent | Amicure PACM | cycloaliphatic amine | | | | | 2.0 | | | | | | |

TABLE II

| Trade Name (Supplier, Location) | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|
| Castor Oil AA | 19.6 | 20.8 | | 89.725 | | 20.8 | | | 23 | | | | 23 | | 18.65 | | 19.6 | |
| #1 Castor | | | 65.4 | | 62.4 | | 94.3 | 71.8 | | 93.8 | 57.4 | 62.4 | | 80.6 | | 62.4 | | 71.8 |
| D B Castor | | | | | | | | | | | | | | | | | | |
| Voranol 230–238 | 15 | 15 | | | | 15 | | | 16.2 | | | | 16.2 | | 27.5 | | 15 | |
| Voranol 240–770 | 29.3 | 29.3 | | | | 29.4 | | | 29.4 | | | | 29.4 | | 30 | | 29.3 | |
| Poly BD 605 | 10 | 10 | | | | 10 | | | 10 | | | | 10 | | | | | |
| Water | 0.2 | 0.2 | | 0.175 | | 0.2 | 0.2 | 0.5 | 0.8 | 0.2 | | | 0.3 | | 0.2 | | 0.2 | 0.5 |
| Ancamine K-54 | | | 0.4 | | 0.4 | | | | | | 0.4 | | | | | 0.4 | | |
| Dabco 33-LV | 2 | 1.4 | | | | 1.4 | | | 1.5 | | | | 1.5 | | 4 | | 3.5 | |
| Dabco T-120 | | | 0.5 | 0.2 | 0.5 | | 0.2 | 0.2 | | 0.2 | 0.5 | 0.4 | 0.5 | 0.3 | 1.5 | 0.5 | | 0.2 |
| Polycat 41 | | | 1.5 | 2.25 | 1.5 | | 1.8 | 2 | | 1.25 | 1.5 | 2 | | 2.25 | | 1.5 | | 2 |
| Polycat 43 | | | 0.2 | 0.25 | 0.2 | | 0.2 | 0.2 | | 1.25 | 0.2 | 0.2 | | 0.225 | | 0.2 | | 0.2 |
| Harcross BK-5099 | 1.2 | 0.6 | | 0.6 | | 0.6 | 0.6 | 0.5 | 0.6 | 0.6 | | 0.4 | 0.6 | 0.6 | 0.6 | | 1.2 | 0.5 |
| Nigrosine Base S | | | 0.5 | 0.3 | 0.5 | | 0.2 | 0.3 | | 0.2 | 0.5 | 0.3 | | 0.3 | 0.3 | | | 0.3 |
| DNP-Dinonyl-phenol | | | 5 | | 5 | | | 9 | | | 5 | 9 | | 10 | | 5 | 10 | 9 |
| Tergitol NP-9 | | | | | | | | | | | | | | | | | | 0.05 |
| TXIB Krumbhaar K-1717 | 10 | 10 | 20 | | 20 | 10 | | 10 | 10 | | 17 | 20 | 10 | | 5.25 | 20 | 10 | 10 |
| Ethylene Glycol | 8 | 8 | 3 | | 6 | 8 | 1 | 2 | 5 | 1 | | 2 | 5 | 2 | | 6 | 8 | 2 |
| Dipropylene Glycol | 3.2 | 3.2 | | 5 | | 3.2 | | | 2 | | 14 | | 2 | | | | 3.2 | |
| 99.5% Glycerin | | | | | | | | | | | | | | | | | | |
| 99.7% Glycerin | | | | | | | | 0.75 | | | | | | | | | | |
| Dow Corning DC-193 | 1.5 | 1.5 | 1.5 | 1.5 | 1.5 | 1.5 | 1.5 | 1.5 | 1.5 | 1.5 | 1.5 | 1.5 | 1.5 | 1.5 | 2 | 1.5 | 1.5 | 1.5 |
| Hardener HY-450 | | | 2 | | 2 | | | 2 | | | 2 | 2 | | 2 | | 2 | | 2 |

TABLE III

| Trade Name (Supplier, Location) | 30 | 31 | 32 | 33 | 34 | 35 | 36 | 37 | 38 | 39 | 40 | 41 | 42 | 43 |
|---|---|---|---|---|---|---|---|---|---|---|---|---|---|---|
| Castor Oil AA | | | | | 82.625 | | 80.65 | | | | | | 20.8 | 23 |
| #1 Castor | 57.4 | 65.4 | 71.8 | 57.3 | | 69.75 | | 68.75 | 71.3 | 64.3 | 71.8 | | | |
| D B Castor | | | | | | | | | | | | | | |
| Voranol 230–238 | | | | | | | | | | | | 15 | 16.7 | 22.1 |

TABLE III-continued

| Trade Name (Supplier, Location) | 30 | 31 | 32 | 33 | 34 | 35 | 36 | 37 | 38 | 39 | 40 | 41 | 42 | 43 |
|---|---|---|---|---|---|---|---|---|---|---|---|---|---|---|
| Voranol 240–770 | | | | | | | | | | | | 29.4 | 29.4 | |
| Poly BD 605 | | | | | | | | | | | | 10 | 10 | |
| Water | | | 0.5 | | | 0.175 | 1 | 0.175 | 1 | | | 0.2 | 0.3 | 0.05 |
| Ancamine K-54 | 0.4 | 0.4 | | 0.4 | | | | | | | | | | 0.8 |
| Dabco 33-LV | | | | | | | | | | | | 1.3 | 1.5 | |
| Dabco T-120 | 0.5 | 0.5 | 0.2 | 0.6 | 0.27 | 0.3 | 0.27 | 0.3 | 0.2 | 0.2 | 0.2 | | | 1.2 |
| Polycat 41 | 1.5 | 1.5 | 2 | 1.5 | 2.025 | 2.25 | 2.025 | 2.25 | 2 | 2 | 2 | | | 1.5 |
| Polycat 43 | 0.2 | 0.2 | 0.2 | 0.2 | 0.2025 | 0.225 | 0.2025 | 0.225 | 0.2 | 0.2 | 0.2 | | | 0.2 |
| Harcross BK-5099 | | | 0.5 | | 0.54 | 0.6 | 0.54 | 0.6 | 0.5 | 0.5 | 0.5 | 0.6 | 0.6 | |
| Nigrosine Base S | | 0.5 | 0.3 | 0.5 | 0.27 | 0.3 | 0.27 | 0.3 | 0.3 | 0.3 | 0.3 | | | 0.5 |
| DNP-Dinonylphenol | 5 | 5 | 9 | 5 | 9 | 10 | 9 | 10 | 9 | 9 | 9 | | | 30 |
| Tergitol NP-9 | | | | | | | | | | | | | | |
| TXIB | 17 | 20 | 10 | 17 | 13 | | 13 | | 10 | 20 | 10.5 | 10 | 10 | 20 |
| Krumbhaar K-1717 | | | | | | | | | | | | | | |
| Ethylene Glycol | | 3 | 2 | | 1.8 | 2 | 1.8 | 2 | 2 | 2 | 2 | 8 | 5 | |
| Dipropylene Glycol | 14 | | | 14 | | | | | | | | 3.2 | 2 | 14 |
| 99.5% Glycerin | | | | | | | | | | | | | | |
| 99.7% Glycerin | | | | | | | | | | | | | | |
| Dow Corning DC-193 | 1.5 | 1.5 | 1.5 | 1.5 | 1.35 | 1.5 | 1.35 | 1.5 | 1.5 | 1.5 | 1.5 | 1.5 | 1.5 | 1.5 |
| Hardener HY-450 | 2 | 2 | 2 | 2 | 1.8 | | 1.8 | | 2 | 2 | 2 | | | |
| Amicure PACM | | | | | | | | | | | | | | 2.0 |

TABLE IV

| Category Raw Material (Trade Name) | Base Resin Poly BD 605 hydroxyl terminated | Plasticiser | Polyol | |
|---|---|---|---|---|
| Raw Material (General Name) | polybutadiene resin | TXiB plasticiser | Papi 2027 polymeric | Papi 2020 isocyanite |
| A | 5 | | 95 | |
| B | | 12.5 | | 87.5 |
| C | | 10 | | 90 |
| D | 10 | | 90 | |
| E | | 5 | | 95 |
| F | | 15 | | 85 |
| G | | 16 | 84 | |
| H | | 3 | | 97 |
| I | | 5 | 95 | |
| J | | 20 | | 80 |
| K | | 5 | 70 | 25 |

What is claimed is:

1. A foamable composition comprising at least two parts:
   a) a first part comprising at least one polyol; at least one thixotropic gelling agent selected from the group consisting of polyamines, aminoalcohols, cycloaliphatic amines, polyamides, peroxides, and mixtures thereof; wherein said polyamines and aminoalcohols are selected from the group consisting of primary amines and secondary amines; at least one blowing agent; at least one hydrophobic ingredient present in an effective amount; at least one urethane reaction catalyst; and at least one isocyanurate reaction catalyst, and
   b) a second part comprising at least one isocyanate.

2. The composition of claim 1 wherein the amount of hydrophobic ingredient present in the first part is at least about 20 wt %.

3. The composition of claim 1 wherein the difference between wet foam density and dry foam density is no greater than 10 lbs/ft$^3$ (0.16 kg/dm$^3$).

4. The composition of claim 1 wherein the polyol is hydrophobic.

5. The composition of claim 1 wherein the polyol is castor oil.

6. The composition of claim 1 further comprising at least one plasticizer.

7. The composition of claim 1 wherein the viscosity of each part is less than about 10,000 cPs at 50° F. (10° C.).

8. The composition of claim 1 wherein each of the first part and the second part is a liquid at a temperature of less than about 30° F. (−1° C.).

9. The composition of claim 1 wherein said composition is foamable underwater and produces a foam having a wet density greater than about 5 lbs/ft$^3$ (0.08 kg/dm$^3$).

10. A method of repair or reinforcement of a structural member having a void, comprising
   i) applying the composition of claim 1 to the void;
   ii) allowing the composition to more readily adhere to the inner surface of the void as provided by the thixotropic gelling action of the gelling agent; and
   iii) sealing the void.

11. The method of claim 10 wherein the mixture is applied at temperatures ranging from about −20° F. (−29° C.) to about 120° F. (49° C.).

12. The method of claim 10 wherein the structural member is selected from the group consisting of railroad ties, building materials, window casements, furniture, wells and concrete members.

13. A method of foaming a composition underwater comprising
   i) submerging an exit port of an applicator in an aqueous environment;
   ii) applying the composition of claim 1 to a substrate submerged in the aqueous environment.

14. A foam mass prepared by a method of mixing the first part and the second part of the foamable composition of claim 1 at an effective stoichiometric ratio.

15. A foam mass of claim 14 having a ball mill demolition loss of less than 40% after 96 hours.

16. The foam mass of claim 15 having a G' of greater than 1×10$^6$ dynes/cm$^2$ at a temperature ranging from 20° C. to 100° C.

17. A foamable composition comprising:
   a) a part A comprising an amount of 30 wt % or greater of at least one hydrophobic polyol, at least one thixotropic gelling agent, at least one blowing agent, at least one urethane reaction catalyst, and at least one isocyanurate reaction catalyst; and
   b) a part B comprising at least one isocyanate.

18. The method of claim 10 wherein the composition can be applied in the presence of substantial quantities of water and produces a foam having a wet density of greater than 5 lbs/ft$^3$ (0.08 kg/dm$^3$).

19. The composition of claim 1 comprising:
 a) a first part comprising
  i) from about 60% to about 80% by weight of said polyol;
  ii) from about 0.5% to about 3% by weight of said gelling agent;
  iii) from about 0.15% to about 0.5% by weight of said blowing agent;
  iv) up to about 40% by weight of said hydrophobic ingredient;
  v) from about 0.3 to about 3% by weight of said catalysts;
  wherein % by weight of components (i)–(v) are based on the total weight of the first part; and
 b) a second part comprising from about 94% to about 97% by weight of at least one isocyanate, based on the total weight of the second part.

20. The composition of claim 2 wherein the hydrophobic ingredient is selected from the group consisting of castor oil, dinonyl phenol, diesel fuel, paraffin waxes, animal or vegetable oil and mixtures thereof.

21. The composition of claim 1 wherein the gelling agent is selected from the group consisting of ethanolamine, diethanolamine, ethylene diamine, toluene diamine, diaminodiphenylmethane, polymethylene polyphenylene polyamine, 4,4'-diamino-diphenyl methane, 3,5-diethyl-2,4-toluenediamine, 4,4'-methylene bis(2-ethyl-benzamine), bis-(p-aminocyclohexyl)methane and polyoxyalkyleneamines.

22. The composition of claim 19 wherein the at least one hydrophobic ingredient is a plasticizer.

23. The composition of claim 19 wherein the at least one hydrophobic ingredient is a mixture of plasticizer and monoalcohol.

24. The composition of claim 1, wherein the ratio of active hydrogen atoms in said first part to isocyanate groups in said second part is from about 1:2 to about 1:4.

* * * * *